United States Patent [19]
St. Clair

[11] 3,764,169
[45] Oct. 9, 1973

[54] INSULATED SWIVEL CONNECTION

[75] Inventor: Theodore A. St. Clair, Fairfield, Conn.

[73] Assignee: Textron Inc., Providence, R.I.

[22] Filed: May 26, 1972

[21] Appl. No.: 257,379

[52] U.S. Cl.................. 285/52, 285/321, 285/354, 285/381
[51] Int. Cl.............................................. F16l 11/12
[58] Field of Search...................... 285/30, 52, 354, 285/386, 387, 321, 351, 381

[56] References Cited
UNITED STATES PATENTS
| | | | |
|---|---|---|---|
| 661,352 | 11/1900 | Moody | 285/354 |
| 682,250 | 9/1901 | Glouber | 285/354 X |
| 3,485,517 | 12/1969 | Howe | 285/54 X |
| 343,138 | 6/1886 | McHugh | 285/354 X |

FOREIGN PATENTS OR APPLICATIONS
| | | | |
|---|---|---|---|
| 666,072 | 7/1963 | Canada | 285/354 |

Primary Examiner—Dave W. Arola
Attorney—Arthur A. Johnson

[57] ABSTRACT

There is disclosed herein a part of the upper portion of a gas meter casing having a threaded hub and a male swivel connected to the hub by a connection nut to engage the threads of the hub, there being a gas sealing and electrically insulating collar between the nut and the swivel, a gas sealing and electrically insulating collar between the swivel and the nut, and a metal stop ring carried by the swivel confined against axial separation from the nipple and located between said insulating collars, the stop ring having a diameter greater than that of the hole in the nut through which the swivel extends so that the stop ring will engage the flange on the nut and prevent the connection nut and meter from falling away from the swivel in the event the insulating collars between the nut and the swivel are destroyed.

1 Claim, 4 Drawing Figures

PATENTED OCT 9 1973 3,764,169

INSULATED SWIVEL CONNECTION

This invention relates to swivel connections for gas meters and particularly to insulated swivels.

An object of this invention is to provide an insulated swivel which is reliable in service and yet is of a construction which is simpler and more economical to manufacture. With insulated swivels as heretofore made, the process involved machining a malleable iron casting for an uninsulated swivel to provide space for insulation of about 0.060 inch thick, then precisely locating the swivel in a mold and molding plastic material on the end portion of the nipple so that the overall size of the end portion is approximately the same as that of an ordinary insulated swivel which the insulated swivel of the present invention must physically displace. Uninsulated swivels are malleable castings machined to precise dimensions.

The operations above referred to, added to the cost of the malleable casting, makes the swivel prohibitively expensive and in some situations results in an uninsulated swivel being used where an insulated swivel should be used for safety's sake.

Heretofore, it has been proposed to make an insulated swivel by either molding a piece of plastic material on the end of a pipe nipple or separately molding the plastic piece and shrinking it on a pipe nipple so that internal grooves from the plastic nosepiece engage ridges on the outer surface of the pipe nipple.

However, a swivel so constructed has the fault or disadvantage that if the plastic nose material should melt or sufficiently soften, which could occur at a temperature of about 400°, the meter with its hub and the connection nut would fall away from the swivel with serious results in the case of a fire in the vicinity of the meter.

An object of the present invention is to provide an insulated swivel which can be manufactured at substantially less cost than such swivels heretofore proposed, and yet prevent separation of the meter from the swivel in case the insulating material should melt or soften the swivel attached to a service connection and the meter being supported against falling when the insulation has been melted.

This is accomplished by the present invention by providing a groove in a pipe nipple and a split stop ring in said groove, insulating both sides of the stop ring between the connection nut and the hub, the diameter of the stop ring being greater than the inside diameter of the flange on the connection nut so that if the insulation melts or softens too much, the stop ring will be engaged by the flange on the connection nut and hold the meter from dropping to the floor or other support beneath the meter.

Other features and advantages will hereinafter appear.

Figure 1:
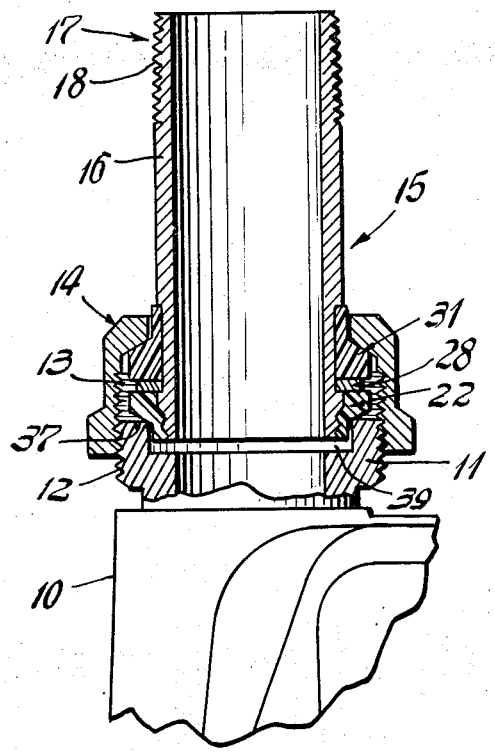
FIG. 1 is a vertical sectional view of the swivel of the present invention showing it attached to a hub on the casing of a gas meter.

As shown in the accompanying drawings, the top 10 of a gas meter has two hubs 11, only one of which is shown. The hub 11 has male screw threads 12 to receive the female screw threads 13 of a connection nut 14.

According to the present invention a swivel 15 comprises a pipe nipple 16 having at its upper end 17, as shown, male screw threads 18 to be received by a screw-threaded member 19, of a gas supply system, from which the meter may be suspended.

The nipple 16 is machined to form a circumferential groove 20 and on its lower end ridges 21. A collar 22 is molded to have a flange 23, a taper 24, a neck 25 and a bore 26. The collar is formed of plastic material and the bore 26 is of such a size that when the collar is heated sufficiently, it will expand so that it can be slid over the end of the nipple and will shrink into the spaces between the ridges 21 and thus be mechanically locked on the end of the nipple, with the top of the collar 22 flush with a shoulder 27 formed by the groove 20.

Then a stop ring 28 which is resilient and split at 29 is forced over the threaded end 17 of the nipple until it comes to rest in the groove 20 between the shoulder 27 and a shoulder 30.

Next a collar 31 of plastic insulating material and having a bore 32 which is slightly smaller than the diameter of the nipple is heated to expand it so that it can be slid over the end 17 of the nipple into engagement with the stop ring 28 which is moved thereby into engagement with the shoulder 27. In this position the collar 31 shrinks and comes to rest in engagement with the bottom of the groove 20 with its top surface 33 engaging the shoulder 30 of the groove so that the collar 31 is anchored against longitudinal movement in the groove 20 between the shoulders 27 and 30.

The connection nut 14 is then slid over the threaded end 17 of the nipple until a taper 34 on the flange 35 of the nut engages a taper 36 on the collar 31. A neck portion 37 on the collar 31 extends between the nipple and the rim of the hole in the nut. The neck 25 on the collar 22 is then placed in a recess 39 in the hub and the connection nut 14 is then applied to the hub and screwed down. When this occurs, the flange 35 on the nut 14 presses down and in on the taper 36 of the collar 31. This presses down on the stop ring 28 thus forcing the nipple and the collar down, forcing the taper portion 23 into engagement with the top surface 37 of the hub.

When the nut 14 is tightened on the hub, the collar 22, stop ring 28, and collar 31 are clamped tightly together and tightened on the nipple 16 thereby rigidly positioning the swivel on the hubs 11.

Normally the parts are so proportioned that the bottom end of the nipple is spaced from the bottom of the recess 39 so that no metal-to-metal contact is made.

Figure 2:
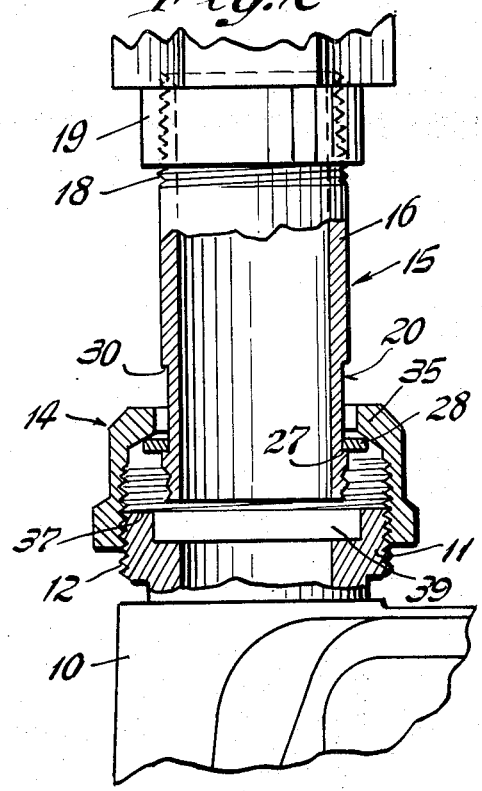
FIG. 2 is a similar view, but showing the gas meter being supported by the connection nut engaging the stop ring on the pipe nipple.
Figure 3:
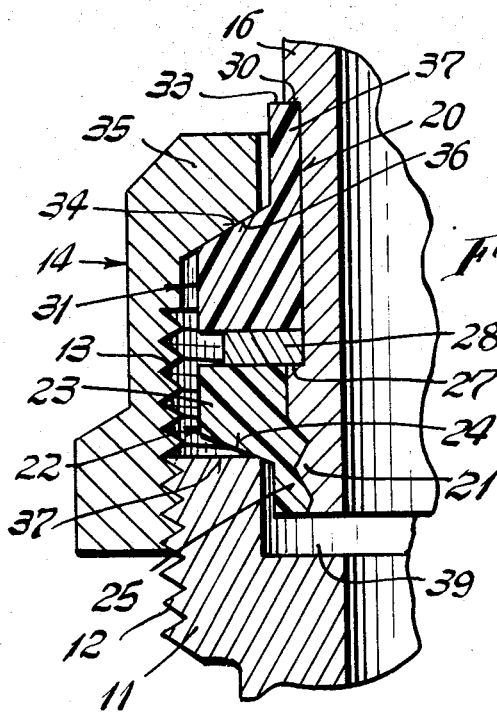
FIG. 3 is an enlarged view of the nose end of the swivel.
Figure 4:
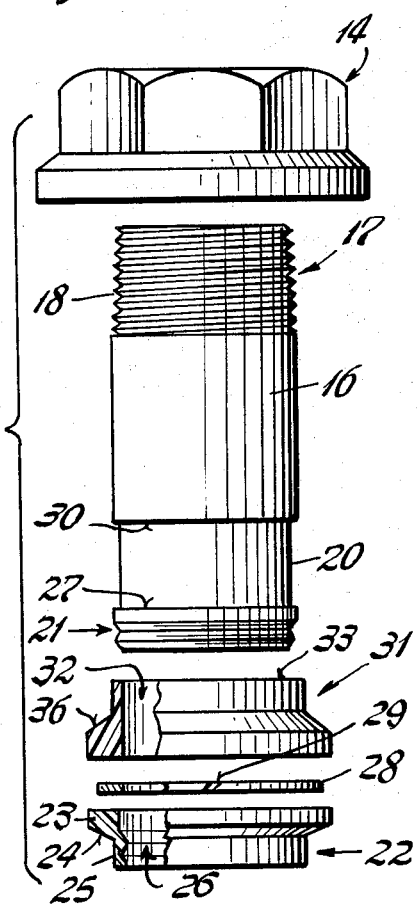
FIG. 4 is an exploded view showing the swivel parts in elevation.

If the collars 22 and 31 should be destroyed or melted due to excessive heat caused by a fire in the vicinity of the meter, the weight of the meter would cause the meter and the connection nut to drop. However, as shown in FIG. 2, the fall would be interrupted by the stop ring 28 (which has a larger diameter than the hole in the connection nut) engaging the flange 35 on the nut. Being then in contact with both the flange 35 and the shoulder 27 on the nipple, the stop ring 28 will limit the amount of gas which may escape from the nipple and meter to the atmosphere if any escape exists at all.

Variations and modifications may be made within the scope of the claims and portions of the improvements may be used without others.

I claim:

1. A fitting for connecting a gas meter having a male screw-threaded hub on a meter top to a gas line to be suspended therefrom, said fitting comprising a pipe nipple having an elongate circumferential groove forming upper and lower shoulders, a connection nut having female screw threads to engage the male screw-threaded hub and having an inwardly extending flange defining a hole through which said nipple extends, the inner surface of the flange sloping downwardly and outwardly away from the nipple, a split stop ring on said nipple resiliently biased to contract and extend into said circumferential groove in said nipple and positioned in engagement with said lower shoulder on the nipple, a first collar of electrically insulating plastic material on said nipple and occupying the space in said groove between said upper shoulder and said stop ring and holding the latter against said lower shoulder, said stop ring having a diameter greater than the diameter of said hole in said connection nut so that if said insulating plastic material should be destroyed or softened, said flange on the nut and said stop ring will engage and prevent the meter from becoming disconnected from said nipple and falling to the floor, said first collar of electrically insulating plastic having a reduced portion forming a neck between and separating said connection nut and said nipple and an outwardly and downwardly extending surface of said nut to press said first collar tightly against said grooved portion of the nipple, a second collar of electrically insulating plastic material secured on said nipple and located between and electrically insulating the stop ring and the adjacent end portion of the nipple, and said second collar having an inclined surface making a gastight engagement with the inside edge of the top surface of the hub when the connection nut is screwed tightly on the hub.

* * * * *

FO-1050
(5/69)

UNITED STATES PATENT OFFICE
CERTIFICATE OF CORRECTION

Patent No. 3,764,169      Dated October 9, 1973

Inventor(s) Theodore A. St.Clair

It is certified that error appears in the above-identified patent and that said Letters Patent are hereby corrected as shown below:

In the claim, column 4, line 11, after "surface" insert --to be engaged by said downwardly and outwardly extending surface--.

Signed and sealed this 19th day of February 1974.

(SEAL)
Attest:

EDWARD M.FLETCHER,JR.
Attesting Officer

C. MARSHALL DANN
Commissioner of Patents